United States Patent [19]

Gould

[11] 4,023,387

[45] May 17, 1977

[54] CABLE DISPENSING AND RETRIEVING DEVICE

[76] Inventor: Ronald Jay Gould, P.O. Box 7, Manhattan, Kans. 66502

[22] Filed: Feb. 9, 1976

[21] Appl. No.: 656,334

[52] U.S. Cl. .................................. 70/233; 70/49; 70/227; 137/355.23

[51] Int. Cl.² ...................................... B62H 5/14

[58] Field of Search ............. 70/18, 30, 49, 57, 61, 70/64, 76, 93, 227, 233–236; 137/355.23; 211/5; 242/107 R, 129.4

[56] References Cited

UNITED STATES PATENTS

| | | | |
|---|---|---|---|
| 527,418 | 10/1894 | Free et al. | 70/227 X |
| 1,468,620 | 9/1923 | Addy | 137/355.23 |
| 2,451,100 | 10/1948 | Lecompte | 70/233 X |
| 3,774,421 | 11/1973 | Stephens, Jr. | 70/234 |
| 3,910,081 | 10/1975 | Pender | 70/233 X |
| 3,910,602 | 10/1975 | Lindner | 70/233 X |
| 3,934,436 | 1/1976 | Candlin et al. | 70/234 |

FOREIGN PATENTS OR APPLICATIONS

| | | | |
|---|---|---|---|
| 132,445 | 7/1901 | Germany | 70/233 |
| 876,220 | 5/1953 | Germany | 70/234 |
| 818,228 | 8/1959 | United Kingdom | 70/30 |

Primary Examiner—Roy D. Frazier
Assistant Examiner—William E. Lyddane
Attorney, Agent, or Firm—Thos. M. Scofield

[57] ABSTRACT

A cable employing device for securing frames to poles and posts; a cable dispensing and recovering casing secureable to a frame which includes releaseable engaging means for one cable end; an improved tensioning system for a cable dispensing casing which ordinarily retains the cable in the casing and returns the cable to the casing after use; a cable retention and return device for use in a cable dispensing container which employs a length of surgical tubing to power the cable retention and return; hinged enclosures for simultaneous enclosure of a cable dispensing system and engagement of a frame support.

8 Claims, 7 Drawing Figures

U.S. Patent    May 17, 1977    4,023,387
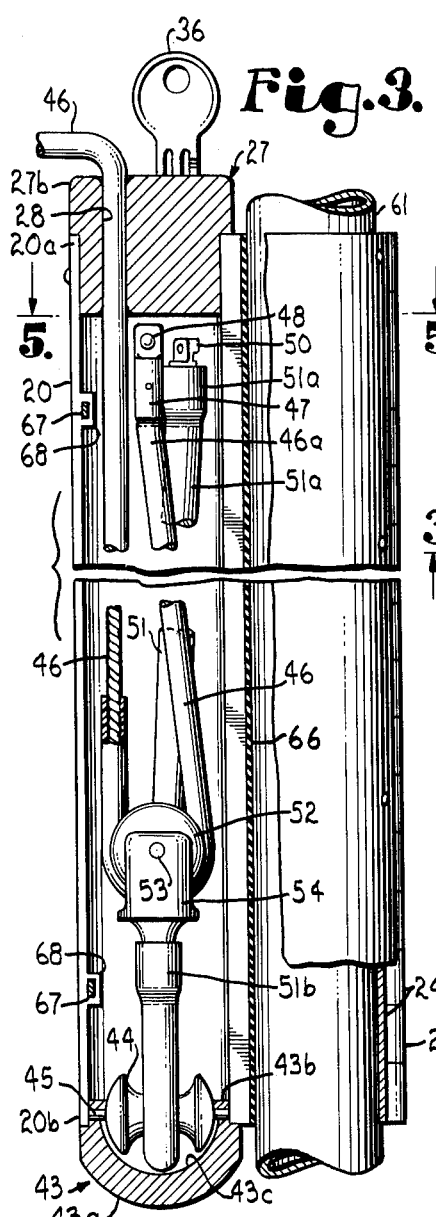

CABLE DISPENSING AND RETRIEVING DEVICE

BRIEF SUMMARY OF THE INVENTION

Basically, the improvement involves a sealed casing formed of force-resistant material which holds therewithin, resiliently retained, a length of cable which may be drawn from inside the casing in order to be looped about a pole, parking meter or the like for securing purposes. The casing has a plug or block in one end thereof with a passage through which the cable is drawn for use and returned after use. There is a plug on the end of the cable and a socket in the block of the casing into which a portion of the plug removably fits. Engaging and locking means, typically key operated, are provided in the casing block for releaseable securement of the plug once inserted into the socket. The return cable means, positioned within the casing, also acts to normally retain the cable length within the casing when the device is not in use.

The particular cable retention and return means involves a length of surgical tubing which is fixed at one end to the inside of the casing and is connected at the other end to a pulley frame which employs a pulley through which the cable is threaded. A shaft or second rotatable pulley is provided in the other end of the casing from the block, around which the surgical tubing threads. When the operator grasps the plug on the outside of the casing and pulls the cable out through the passage in the block, the pulley frame to which the length of surgical tubing is attached moves from the end of the case opposite the block to a position adjacent the block. This draws out and extends the length of surgical tubing, passing around the shaft, placing the tubing under tension and thus, also, through the pulley and its frame, the length of cable which is now external of the casing. When the pull on the plug or cable external of the casing is released, the tension in the surgical tubing pulls the pulley and its frame the length of the casing, returning the cable into the casing through the passage in the block.

The casing is conveniently constructed of two tubing half-sections. The block may be secured in the end of one of the tubing half-sections. An end plug carrying the shaft or pulley around which the tubing is drawn is secured to the other end of that tubing half-section. The end of the cable and the end of the tubing are secured to the inner face of the tubing half-section adjacent the block.

In order to make a convenient enclosure which gives access, when opened, to the interior of the casing and also permits ready mounting of the entire assembly around a frame element, the casing tubing sections may each be fixed at one side edge to a like tubing half-section, the latter hinged on one edge to one another.

OBJECTS OF THE INVENTION

A first object of the invention is to provide a cable employing device by which a bicycle can readily be secured, against theft, to a post, tree or the like, wherein the cable, when not in use, is automatically and resiliently retracted into the carrying container therefor.

Another object of the invention is to provide a bicycle securing or locking device including an elongate sealed container readily mountable and fixedly securable on the frame of the bicycle which is to be protected, the container carrying a flexible cable-like member ordinarily (out of use) being fully received and concealed in such container, resilient cable return and retention means also fully received within the said elongate container in protected fashion.

Another object of the invention is to provide a unitary, rugged, strong, simple device and means incorporating: (1) removably securable means for fixing the device to the frame of a bicycle, (2) a retractable cable for looping around an object to which the bicycle is to be secured, (3) resilient cable retainer means for normally (out of use) retaining the cable and returning the cable after use, and (4) a container adapted to receive the said cable and cable return means, as well as (5) a locking device adapted to engage the free end of the cable after same has been looped around the object to which the bicycle is to be secured.

Another object of the invention is to provide a novel cable holding and dispensing means utilizing various attaching, coupling and guiding means wherein a length of usable resilient cable may be paid out from and returned to an elongate container therefor, the said means also incorporating resilient cable return means of novel character.

Another object of the invention is to provide a cable dispensing and engaging device which is adaptable in use to secure substantially any metal frame object to an adjacent pole, tree or the like, the most common such securable object being a bicycle, but outdoor furniture, gates and other easily movable personal property, such as children's wheeled vehicles also being conveniently usable with the improved device. The device is also usable with motorcycles and boats.

Another object of the invention is to provide a cable dispensing container which additionally resiliently retrieves the cable, wherein the resilient retrieval means for the cable is independent of the cable and its attachment to the container from which it is dispensed, whereby strong and drastic pulls or tugs on the cable will in no way damage or impair the efficiency of the cable retrieving means.

Another object of the invention is to provide novel cable dispensing and retrieval means which utilize the unique qualities of surgical tubing to provide a long life, dependable, strong and sure cable retrieval system when employed in the manner disclosed.

Another object is to provide a unique and novel cable holding, dispensing and retrieval means which contains, in a unitary device, all of the necessary engaging and locking devices which are needed to securely lock a bicycle or any frame-type object to poles or other fixed objects, thus eliminating the necessity of the bicycle rider, for example, carrying a length of cable or chain and a lock therefor by any other method or means (such as wrapped around his chest).

Another object of the invention is to provide such an improved cable holding, dispensing and securing means which may be used without a key operated locking mechanism, the key and lock being replaced by a simple hand-operated lever operable to make and/or release engagement of the free end of the cable, whereby the device may be used in place of a gate latch or the like.

Other and further objects of the invention will appear in the course of the following description thereof.

In the drawings, which form a part of the instant specification and are to be read in conjunction therewith, an embodiment of the instant invention is shown and, in the various views, like numerals are employed to indicate like parts.

FIG. 1 is a fragmentary elevation of a portion of a conventional bicycle frame with the subject device affixed thereto with the bicycle frame being secured to a post or parking meter by the securing means constituting the instant invention. The showing in dotted lines illustrates an alternative positioning of the device on a bicycle frame.

FIG. 2 is an end view, looking downwardly from above on the device in the position of FIG. 1, the bicycle frame sectioned just above the point at which the device embraces same.

FIG. 3 is a view taken along the lines 3—3 of FIG. 2 in the direction of the arrows.

FIG. 4 is a fragmentary view of the upper part of the device of FIG. 3, showing the cable dispensed out the casing with the locking plug engaging the socket in the end of the casing.

FIG. 5 is a view taken along the lines 5—5 of FIG. 3 in the direction of the arrows, with a dotted line showing of the casing open for mounting on the bicycle frame.

FIG. 6 is a view taken along the lines 6—6 of FIG. 5 in the direction of the arrows.

FIG. 7 is a fragmentary sectional view (showing the locking plug engaged by a portion of the lock mechanism) of the upper end of the cable carrying side of the casing.

DETAILED DESCRIPTION

Referring to the figures, therein is seen the subject cable dispensing and securing means or device and means for securing same to an element of a frame-including object. Basically, the structure comprises a sealed casing having a length of cable therewithin, one end of which is secured to the casing, means for normally retaining the cable in the casing and returning same thereto after use, a plug on the end of the cable and a block comprising part of the casing having a socket therein to receive part of the plugs, as well as locking means to secure that part of the plug in the block, releaseably. Means are also provided to secure the casing, removably, to a frame element of a bicycle or the like.

The particular embodiment of this improvement seen in the drawings employs four elongate half tube sections 20–23, inclusive, to basically form the casing and the means for attaching the casing to a frame element. Specifically, a first arcuate tubing half-section 20 has integrally or otherwise attached along one edge thereof like tubing half-section 21. These tubing half-sections may be of steel, aluminum, aluminum alloy or any force-resistant material. Section 21 has hinge members 24 fixed along one edge thereof. Tubing half-section 23 likewise has identical tubing half-section 22 welded or otherwise fixedly attached thereto, the latter having hinge elements 25 fixedly connected to one edge thereof. Employing rod 26, then, to engage the hinge elements 24 and 25, the four tubing half-sections are connected to one another in such manner as to open and close to form two complete, elongate, hollow cylinders or tubes.

It is feasible that tube half-sections 21 and 22 be only a fraction of the length of sections 20 and 23. In such case, they would be preferably fixed to adjacent sections 20 and 23 equally spaced inwardly from the ends thereof. Likewise, in such case, the securement of sections 20 and 23 to one another and to blocks 27 and 43 (to be described) would necessarily have to be very effective.

A cylindrical block generally designated 27 is glued, welded, riveted or otherwise rigidly fixed into one end 20a of tubing half-section 20. Block 27 has cylindrical lesser diameter inner portion 27a and greater diameter outboard cylindrical portion 27b. The latter overlies and is fixed flush against end 20a of tubing 20 in sealing fashion. A first cable carrying passage 28 is provided through block 27 and adjacent to same, but spaced therefrom, there is provided a socket opening 29 which also preferably passes through or substantially through block 27. On the inboard side of block 27 there is provided an elongate slot 30 which centrally opens out of the inboard side block 27 as at 31. Finally, cylindrical passage 32 is provided through block 27 opening into slot 30 on its inboard end. Cylindrical, keyoperated member 33 rotatably fits within passage 32 and has an outboard enlarged end 34 fixed thereon. A key slot 35 is provided into member 33 through enlarged cap 34 thereof adapted to removably receive key 36. Internally threaded opening 37 removably receives the externally threaded end of screw 38 which fixes cam 39 to the inboard end of member 33 whereby cam 39 rotates with member 33 when the latter is turned by key 36. Slide 40 is slidingly received in slot 30 and normally biased away from passage 29 in block 27 by means which includes (a) pin 40a, fixed to slide 40, (b) spring 41 and (c) pin 42 which is fixed into the underside of block 27 adjacent slot 30 in the end thereof away from socket 29. Spring 41 connects pins 40a and 42 thus to normally bias slide 40 free of passage 29 which intersects slot 30 as does passage 32.

Looking at the other end of tubing half-section 20, therein is received a fitting generally designated 43 having an outboard portion 43a which may be rounded as shown and an inboard lesser diameter portion 43b which fits within and is rigidly attached to (riveted, glued, welded, screwed or the like) the inside end 20b of tubing half-section 20. Received within the arcuate inner portion 43c of fitting 43 is a rotatable pulley 44 which is fixed into position in fitting 43 by shaft 45, the latter fixed to inboard portion 43b of fitting 43 so that pulley 44 may rotate thereon.

An elongate cable 46 has its inboard end 46a fixed into collar 47 which is welded, riveted or otherwise fixedly attached as at 48 to the inside surface of tubing half-section 20 closely adjacent the inboard face of block 27. Cable 46 is preferably covered with weatherproof plastic in its entire length. The outboard end 46b of cable 46 is connected into an elongated plug generally designated 49 having a greater outer diameter portion 49a and a lesser diameter portion 49b, the latter having, near the tip thereof, least diameter portion 49c for engagement by slide 40 when plug portion 49b is in socket or passage 29 as seen in FIG. 7.

The length of cable 46 is approximately twice the length of the inside of the casing, although it may be somewhat shorter. If it is much longer, the larger diameter portion 49a of plug 49 will not normally rest flush against the outer face of block 27 when the device is not in use, as is desirable.

Welded, riveted or otherwise fixed to the inner face of tubing half-section 20 adjacent the inboard face of block 27 and spaced laterally from connection 48 is fitting 50 which has an extension 50a over which removably and frictionally is fitted one end 51a of a length of surgical tubing 51. Surgical tubing 51 is of a length greater than the length of the inside of the casing and threads around pulley 44 so that the other end 51b thereof, even when the tubing is not stretched or under tension, will be extending back toward block 27. A rotatable pulley 52 is mounted upon shaft 53 carried by pulley frame 54 which has an extension 55 over which tubing end 51b removably but tightly and frictionally is attached. FIGS. 3 and 6 show two views, at right angles to one another, of these elements of the cable and cable return system and the attachments and accessories therefor within the casing.

In FIG. 1, there is shown, in that fragmentary view, a portion of a bicycle frame having horizontal frame member 60 with vertical frame member 61 extending at substantial right angles thereto and carrying at its upper end seat 62. The bicycle rear wheel 63 is mounted in conventional fashion on the rear frame members, of which only 64 is seen. In the view of FIG. 1, the entire assembly of FIGS. 2–6, inclusive is seen mounted upon frame member 61 with tubing half-sections 21 and 22 embracing frame member 61. Preferably, plastic, rubber or other frictional linings 65 and 66 are provided integral with the inside faces of tubing half-sections 22 and 21, respectively, so that a tight frictional gripping of the assemblage on frame member 61 may be provided. As was noted above, the length of the tube sections 21 and 22 may be substantially less than the length of the tube sections 20 and 23, if desired. However, equal length gripping sections and casing sections are preferred.

In the view of FIG. 1, the block 27 is shown upwards in the view so that the general orientation of the device in FIG. 1 will be the same as in FIGS. 3, 4 and 6, as well as 7. However, in actual use, it would be preferred to have block 27 in the downward position, inverting the showing of FIG. 1 in order that the operative end of the device would be more protected from weather. This would also place the cable engagement of post 70 lower thereon which is desirable. FIG. 1 additionally shows, in dotted lines, an alternative mounting of the device on a bicycle frame with the cable withdrawal end to the rear. This position offers some weather protection, particularly with a cap applied over the end of the device as is seen in the dotted line showing.

In FIGS. 3, 4 and 5 there are shown tabs 67 when are operative to engage slotted recesses 68 between half-sections 23 and 20. In order to secure the pivotally openable tubing sections (see FIG. 5 for open and closed positions), locking screws, rivets, conventional welding, gluing or other fixed or removable attachments may be employed between, say, tubing section 23 at the ends 23a and 23b thereof with the lesser diameter portions of block 27 and fitting 43. Additionally, the edges of tubing half-sections 23 and 20, both sides, may be permanently glued together if it is not desired to have access to the inside of the casing once it is applied to a frame. Alternatively, screw attachments, bolt attachments or other suitable locking means may be employed to close the entire casing structure on itself (lefthand portion of FIGS. 3–5, inclusive) and also upon the frame (righthand portion of the same views).

Access may be desired to the casing portion of the entire housing to replace the surgical tubing length from time to time after long intervals of continued use. It should be understood that breaking or detaching of the tubing will have no effect whatsoever upon the effective use of the cable in the attachment as seen in FIG. 1. The only effect would be to require the user to return the cable, length by length, to the casing without the aid of the resilient cable return means. As may be seen from FIG. 4, the entire removal of the cable from the device is effective without involving anything with respect to the return system other than stretching the surgical tubing length.

OPERATION

In operation of the device, any means which have been employed to maintain the device in the closed position of FIGS. 2 and 5 (but without the frame element therein) are removed and the hinged half-section tubing sections 22 and 23 swung open as seen in dotted lines in FIG. 5. As previously noted, both block 27 and fitting 43 are rigidly fixed to tubing section 20. The same is true of the cable attachment and the cable return means since pulley 44 is rotatably mounted in fitting 43. The pulley 52 and cage or frame 54 are threaded by the loop of cable 46 attached inboard at 48 and leading to plug 49 outside block 27.

The device is carried to the bicycle or other frame-containing object to be secured and a frame element such as beam 61 of the bicycle of FIG. 1 is received in (fitting into) tubing half-section 21. The hinged section of tubing half-sections 22 and 23 is then closed into the full line position of FIG. 5 with the frictional linings 65 and 66 gripping frame member 61. Before such closure, if it is desired to be permanent, epoxy glue or the like is applied to the edges of tubing half-sections 20 and 23 centrally and outboard thereof and, further, to the lesser diameter surfaces of block 27 and fitting 43. In this manner, when the sections are closed upon one another to the full line position of FIG. 5, a permanent mounting of the assembly is achieved. Such glue may be applied to the inner faces of the linings 65 and 66 for additional strength of attachment. Alternatively, when the end sections are closed, such screws, bolts, rivets or the like are applied into the fitting 43 and block 27 as will rigidly fix sections 23 and 20 to one another, closing the casing side of the entire housing, as well as the frame engaging portion thereof in secure fashion.

When it is desired to secure the frame or bicycle to a post, parking frame, or the like, the plug 49 (see FIG. 6) is grasped and pulled outwardly from block 27, feeding cable 46 out through passage 28. As the cable is withdrawn from the casing of sections 20 and 23, the surgical tubing 51 stretches. Because of the pulley 52, two lengths of cable are removable from the casing for an equivalent stretch of one length of tubing. Full withdrawal is seen in FIG. 4. This is the situation in FIG. 1 with the cable fully withdrawn and laced around a post 70. Plug 49a has the lesser diameter portion 49b thrust into socket 29 so that least diameter portion 49c thereof lines up with slide 40. The user then inserts key 36 into keyhole 35 in member 33 and rotates member 33 so that the cam thrusts slide 40 into position to lock plug 49 into socket 29. Reversal of the key rotation after reinsertion thereof will release the plug 49 and the tension of the surgical tubing will draw the cable back into the casing to the position of FIGS. 3 and 6.

More complicated locking mechanism may be employed as desired, that shown being of great simplicity. The change of means for, say, moving slide 40 back and forth against the return action of spring 41, would not change the structure or operation of the other parts.